US008028201B2

(12) United States Patent
Anna et al.

(10) Patent No.: US 8,028,201 B2
(45) Date of Patent: Sep. 27, 2011

(54) LEVELED LOGGING DATA AUTOMATION FOR VIRTUAL TAPE SERVER APPLICATIONS

(75) Inventors: Gary Anna, Tucson, AZ (US); Ralph Thomas Beeston, Tucson, AZ (US); Henry Z. Liu, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 12/117,893

(22) Filed: May 9, 2008

(65) Prior Publication Data

US 2009/0282297 A1 Nov. 12, 2009

(51) Int. Cl.
*G06F 11/00* (2006.01)
(52) U.S. Cl. ........... 714/45; 714/42; 714/48; 714/54
(58) Field of Classification Search ........ 714/27, 714/42, 45, 48, 54; 707/999.202; 711/111; 709/224; 719/224
See application file for complete search history.

(56) References Cited

U.S. PATENT DOCUMENTS

| | | | |
|---|---|---|---|
| 5,170,480 A | 12/1992 | Mohan et al. | |
| 5,832,508 A * | 11/1998 | Sherman et al. | 707/999.2 |
| 5,864,665 A | 1/1999 | Tran | |
| 5,884,324 A | 3/1999 | Cheng et al. | |
| 5,923,833 A | 7/1999 | Freund et al. | |
| 5,956,712 A | 9/1999 | Bennett et al. | |
| 6,044,398 A | 3/2000 | Marullo et al. | |
| 6,056,786 A | 5/2000 | Rivera et al. | |
| 6,185,608 B1 | 2/2001 | Hon et al. | |
| 6,189,069 B1 * | 2/2001 | Parkes et al. | 711/100 |
| 6,209,031 B1 | 3/2001 | Casey et al. | |
| 6,246,672 B1 | 6/2001 | Lumelsky | |
| 6,438,600 B1 | 8/2002 | Greenfield et al. | |
| 6,567,920 B1 | 5/2003 | Cromer et al. | |
| 6,633,874 B1 | 10/2003 | Nusbickel | |
| 6,654,886 B1 | 11/2003 | Challener et al. | |
| 6,662,230 B1 | 12/2003 | Eichstaedt et al. | |
| 7,017,084 B2 * | 3/2006 | Ng et al. | 714/45 |
| 7,062,551 B2 | 6/2006 | Sedlack | |
| 7,120,685 B2 | 10/2006 | Ullmann et al. | |
| 7,200,620 B2 | 4/2007 | Gupta | |
| 7,216,149 B1 | 5/2007 | Briscoe et al. | |
| 7,330,859 B2 | 2/2008 | Gupta et al. | |
| 7,454,779 B2 | 11/2008 | Hughes et al. | |
| 2004/0225689 A1 | 11/2004 | Dettinger et al. | |
| 2005/0028171 A1 | 2/2005 | Kougiouris et al. | |
| 2005/0066116 A1 * | 3/2005 | Bello et al. | 711/111 |
| 2006/0075308 A1 | 4/2006 | Haselden et al. | |
| 2006/0174165 A1 | 8/2006 | Shaffer et al. | |
| 2006/0206539 A1 | 9/2006 | Thompson et al. | |
| 2006/0294423 A1 * | 12/2006 | Shankar et al. | 714/20 |
| 2007/0061540 A1 * | 3/2007 | Rafert et al. | 711/170 |

* cited by examiner

*Primary Examiner* — Robert Beausoliel, Jr.
*Assistant Examiner* — Joseph D Manoskey
(74) *Attorney, Agent, or Firm* — Hamilton & Terrile, LLP; Stephen A. Terrile

(57) ABSTRACT

A method, system, and program product for a VTS subsystem's logging server to optimize applications' logging data entries where applications use the logging service. More specifically, in certain embodiments, the system comprises logic executed within a VTS subsystem to which a tape library subsystem is attached. The logic controls VTS subsystem applications' logging data entry strategy through applications' configured logging level, log entry category, and a cache buffer. The logic not only dynamically balances applications' logging request but also maximizes the availability of system information.

15 Claims, 6 Drawing Sheets

LEVELED LOGGING DATA AUTOMATION FOR VIRTUAL TAPE SERVER APPLICATIONS

BACKGROUND OF THE INVENTION

1. Field of the Invention

The present invention relates in general to the field of computers and similar technologies, and in particular to software utilized in this field. Still more particularly, the present invention relates to logging data automation for Virtual Tape Server (VTS) applications.

2. Description of the Related Art

It is known for system applications to level their logging data to balance various resources consumptions such as system outage cost, labor cost, etc. Typically an application is designed to handle staged logging levels, such as production level, testing level, debug level, development level, etc, and users can turn on/off different logging levels at run-time in order to satisfy their particular interests from debugging applications' hardware or software errors, monitoring systems' performance at various I/O states, analyzing system's execution statistics at various stages, etc.

For a production system, if an application processes too much logging data, the processing can affect system resources, such as performance, memory, storage, etc. However, if an application processes too little logging data, it is often difficult for system support structure to understand a system failure when such an error occurs. In turn, more labor might be required to resolve the problem, or the system may experience much longer outages. Additionally, because an occurrence of an error is mostly unpredictable, having an application process excessive logging data, unconditionally, during periods of stability for the production system can be unfair.

Accordingly, often only minimized logging data is processed to monitor a system's important run-time status. In other words, production level of logging data is turned on for an application in a production system. When an error occurs, and the production level of data cannot provide a satisfactory resolution, then a higher logging level (i.e., debug level) turns on to catch more data that are detailed when the same error occurs again. This can be a timely and costly process, and can cause multiple system outages.

Thus, an optimal logging level management is desirable from the perspective of system's overall resource management.

SUMMARY OF THE INVENTION

A method, system, and program product are disclosed for VTS subsystem's logging server to optimize applications' logging data entries where applications use the logging service. More specifically, in certain embodiments, the invention comprises logic executed within a VTS subsystem to which a tape library subsystem is attached. The logic controls VTS subsystem applications' logging data entry strategy through applications' configured logging level, log entry category, and a cache buffer. The logic not only dynamically balances applications' logging request but also maximizes the availability of system information. Additionally, in certain embodiments, the invention comprises logging level reset automation logic in which a logging server provides an efficient method to dynamically reset an application's logging level whenever there is need to minimize logging level impact to the overall system performance.

The method of logging level automation provides an optimized logging level strategy for VTS applications such as those that use common logging service. Although primarily intended for VTS, this method could equally be used by a Virtual Optical Disk Server, a Virtual Holographic Disk Server, a Virtual Hard Disk Array, or any other form of virtual storage. Such a virtual system may be implemented in solid-state memory comprising RAM (random access memory) or FLASH memory, or in a RAID array of hard disk drives.

The method uses an element, referred to as an Error-Data-Cache-Buffer (EDCB) element, to automatically collect certain important error logging data that is not at the current planned logging level, and temporarily save the important error logging data in a cache buffer for a short amount of time. This method not only reduces the system resource consumption, but it is ready to save the detailed important error logging data whenever there is a need for system support structure. The method provides a run-time logging data level reset algorithm triggered by matched error code categories, and automation to dump and store EDCB data. This method avoids the delay in manually turning on the different logging levels as is often necessary in future data collection, and might collect sufficient data in the first time of error occurrence to avoid multiple system outages.

The invention provides an optimal method to automate different logging levels at run-time, whenever there is a need in a VTS subsystem, and automatically collects certain filtered important data by current logging level prior to the time when an error occurs.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings. The use of the same reference number throughout the several figures designates a like or similar element.

DETAILED DESCRIPTION

Figure 1:
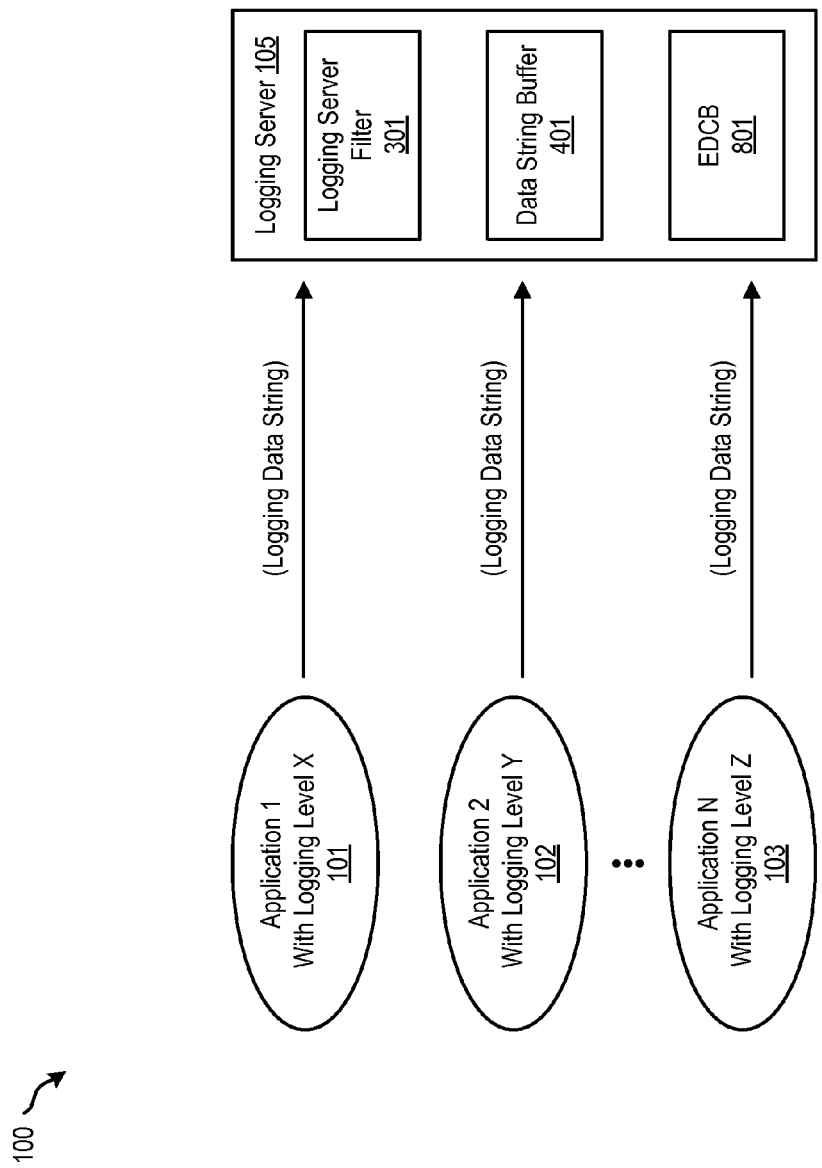
FIG. 1 shows a block diagram of a logging server as well as a plurality of applications.
Figure 2:
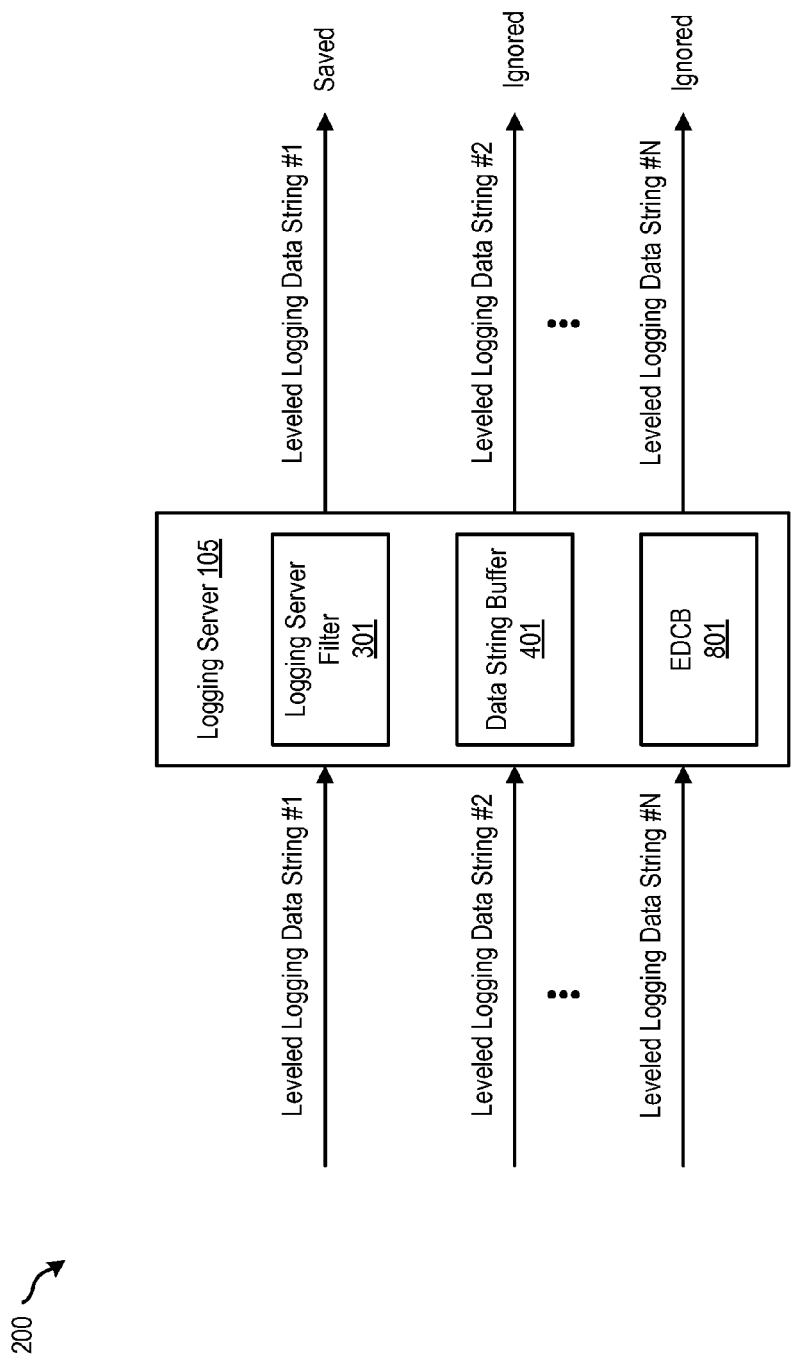
FIG. 2 shows a block diagram of a logging server handling a leveled logging data string.
Figure 3:
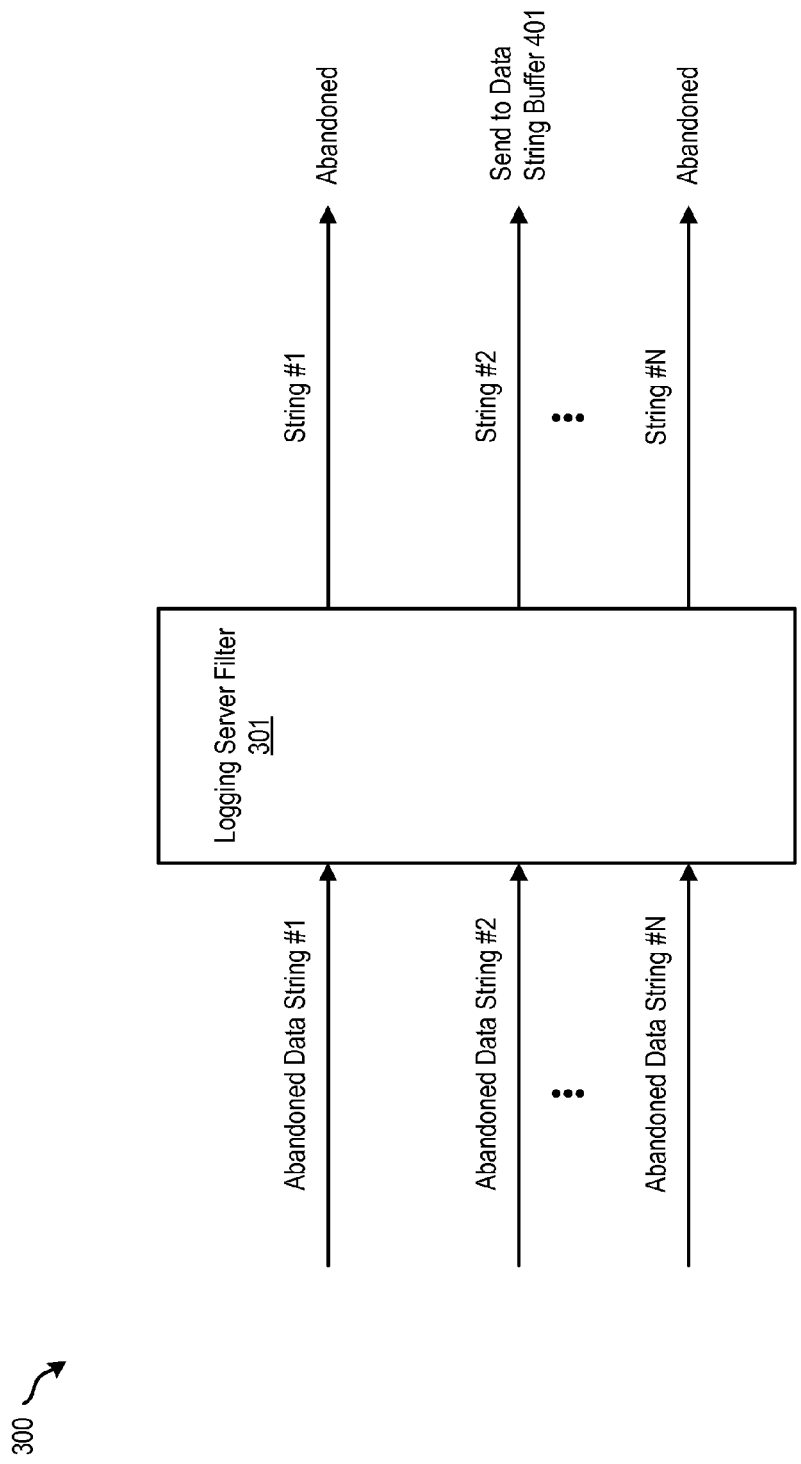
FIG. 3 shows a block diagram of the operation of a logging server filter.
Figure 4:
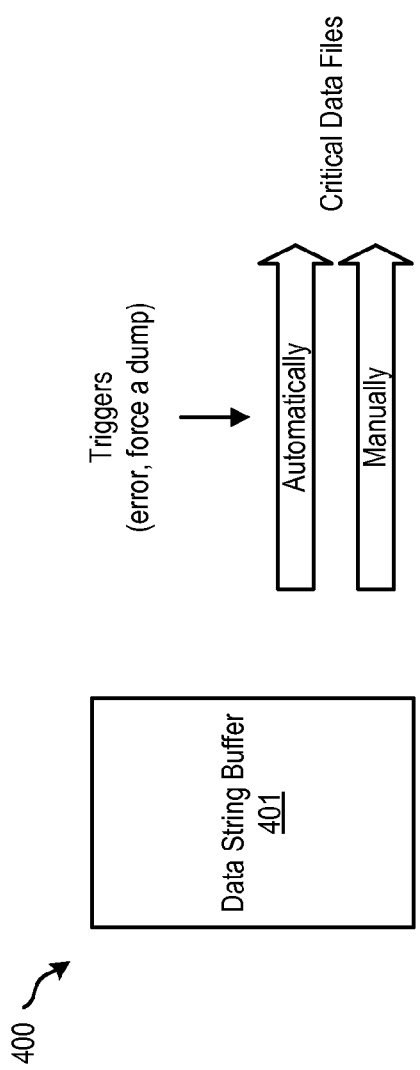
FIG. 4 shows a block diagram of the operation of a data string buffer.

Referring to FIGS. 1 and 2, the invention provides a method to successfully manage certain filtered-out logging data string abandoned because of the current applications' logging level settings. Whenever logging data generated by applications 101, 102, and 103, with attributes of logging level delivered to the logging server 105, the logging server then determines if this data requires to be saved or ignored based on the applications' current logging level settings. For those "ignored" data strings, some of the ignored data flow into a cache buffer 401 after going through the logging server filter algorithm 301 (see e.g., FIG. 3), and are temporarily saved, while others of a lesser value are then truly "abandoned". In such a way, some of the critical error related information is preserved for certain amount of time (depending the size of cache buffer 401), but not totally abandoned. At the time that the mission-critical data are needed, the data is automatically saved (for instance when some errors occur during the system's production time), or the data can be manually saved at any time when some one wants to review more detailed system logging data out of data string buffer 401. (See e.g., FIG. 4.)

Figure 5:
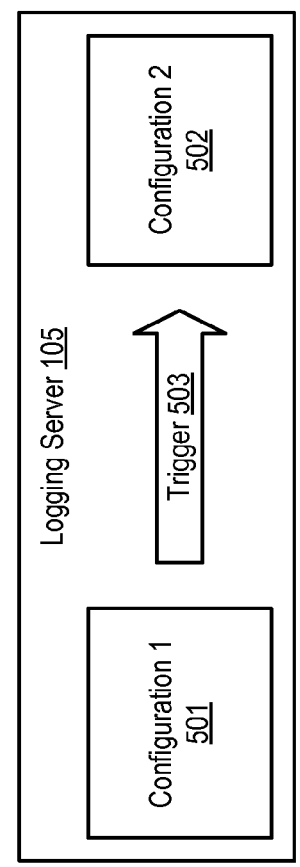
FIG. 5 shows a block diagram of a logging server performing an automated logging level reconfiguration.

Referring to FIG. 5, an application's logging level is configured or registered to logging server 105 at its initialization, a production level at a production system for instance, and stays the same level during its life time, unless it is reconfigured. This reconfiguration happens when a user support structure deems that the current logging level or logged data does not satisfy specific requirements. In particular, when an error occurs at the system, a device I/O failure for instance, a production level of logged data may not have enough information to provide a satisfactory resolution, and hence a much higher logging level should be activated to catch more data when the same error occurs again. Waiting until the same error re-occurs can be a quite costly process in the diagnosis of system error. The present invention provides the mechanism that whenever there is a need for a higher level of logging data; the need can trigger the logging server to automatically reconfigure an application logging level, pursuant to pre-defined criteria, which is a hands-off and policy-based decision. In particular, when an error occurs, logging server 105 adaptively triggers 503 a reconfiguration of the related application's logging level configuration from 501 to 502 without any delay or manual effort.

Because the occurrence of an error is typically unpredictable, it is undesirable to leave a wide-ranging higher logging level for a long period of time for a production system, looking for the second occurrence of an error, and incur a considerable resource cost to the production system. So, a timestamp is attached at each logging level configuration. Whenever the current configuration is expired, the method resets the logging level per application-level criteria established by the user. The advantage of this time-stamped level configuration is to not only collect the right logging data, but also minimize the system resource consumption (as soon as the desired error data is collected, decrease the logging level, etc.).

Figure 6:
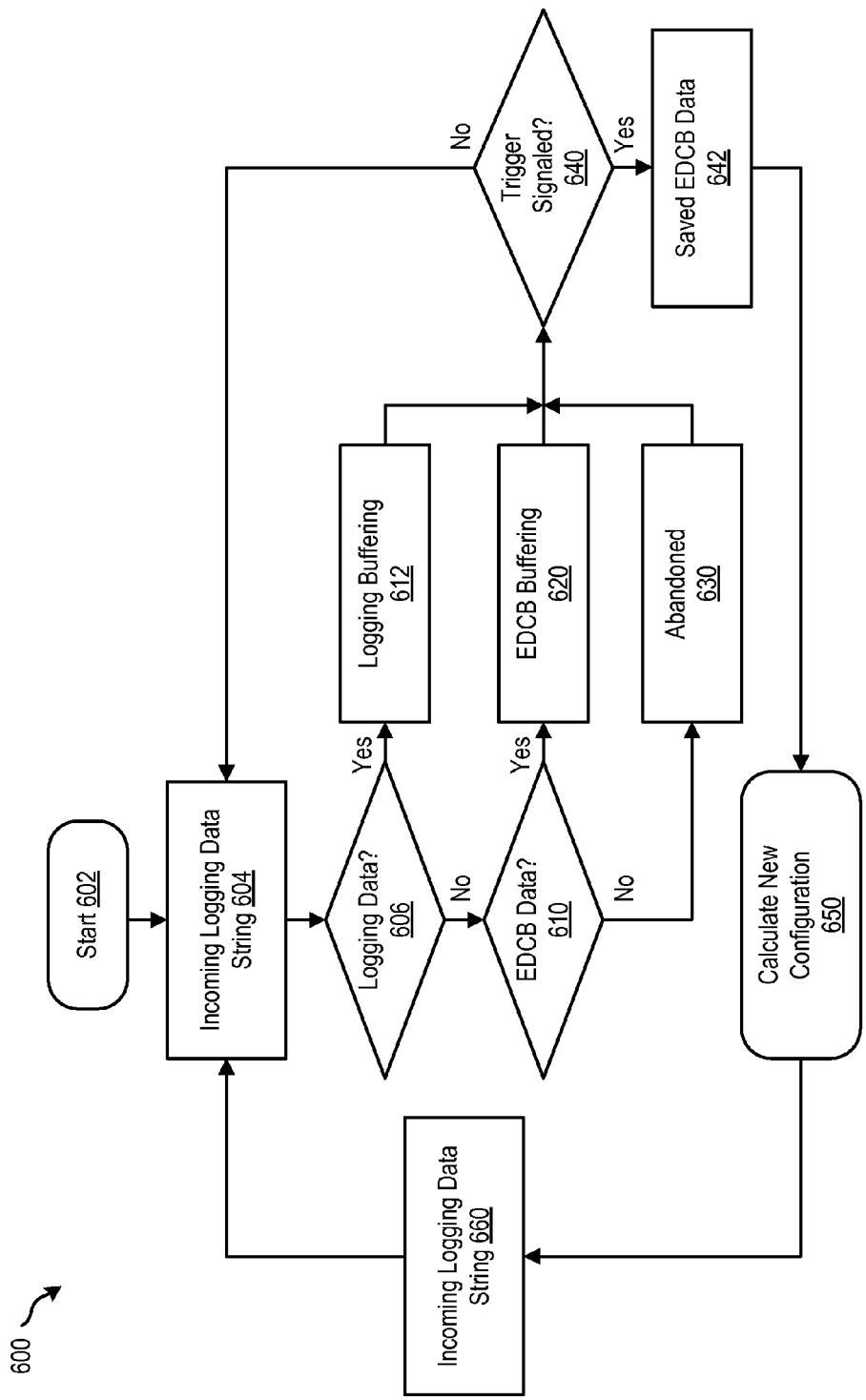
FIG. 6 shows a flow chart of logging server data flow.

Referring to FIG. 6, a flow chart of logging server data flow is shown. More specifically, when logging server receives an application's leveled logging data, step 604, the logging server checks this data string's attached priority against its pre-registered configuration priority to determine data string's next flow direction. In step 606, a decision is made regarding the logging level is satisfied and if the answer is yes, process 600 sends the data string to the current application's log file buffer, step 612. If the answer is no in step 606, the process flows to step 610 where a check is made whether the data string has buffer priority that exceeds a predefined threshold. If the answer is yes in step 610, the data string is sent to the EDCB (Error-Data-Cache-Buffer), step 620. If the answer is no in step 610, the data string is determined as too costly to retain and it is abandoned, per step 630.

EDCB 801 may reside in Logging Server 105 as a separate entity. Alternately, EDCB 801 may reside as a partition in Data String Buffer 401.

Depending on system's resource distribution, EDCB size is configurable, and as a fixed size data buffer, it can only host a finite number of data entries. The EDCB is preferably managed as a simple FIFO cache pipe. As an alternate embodiment, the predefined threshold in step 610 becomes time-dependent and the threshold is selectively raised for data strings of an older age and after the EDCB fills to a certain point, which allows the data strings already in the EDCB to be selectively scrubbed, so that fewer of the older and less-important data-strings are retained in the nearly-filled EDCB, which frees up space in the EDCB for newer and potentially more relevant data-strings.

As soon as logging server 105 is triggered, by a system signal, for instance, it will immediately dump all the data in EDCB to backup storage, such as a hard disk drive. In such a way, a certain amount of error critical data is preserved for certain amount of time, prior to the triggering moment. So after steps 612, 620 and 630 where logging server sorts the applications' logging data strings in one of three directions, a check is performed to determine if the logging server receives a trigger signal, such as trigger 503 (see e.g., FIG. 5), in step 640. If the answer is no, the process flows back to step 604 to handle subsequent incoming logging data strings. If the answer is yes in step 640, data in EDCB is saved in step 642, and a new logging level is calculated immediately in step 650. Based upon the result of calculation, the logging level is reconfigured, a new timer is started, and a flag is raised in step 660. Then process 600 flows back to step 604 to handle the future logging data strings under the new logging level configuration. Moreover, from this time on, the logging server has different criteria in routing applications' logging data string to these three directions (steps 612, 620, and 630).

Figure 7:
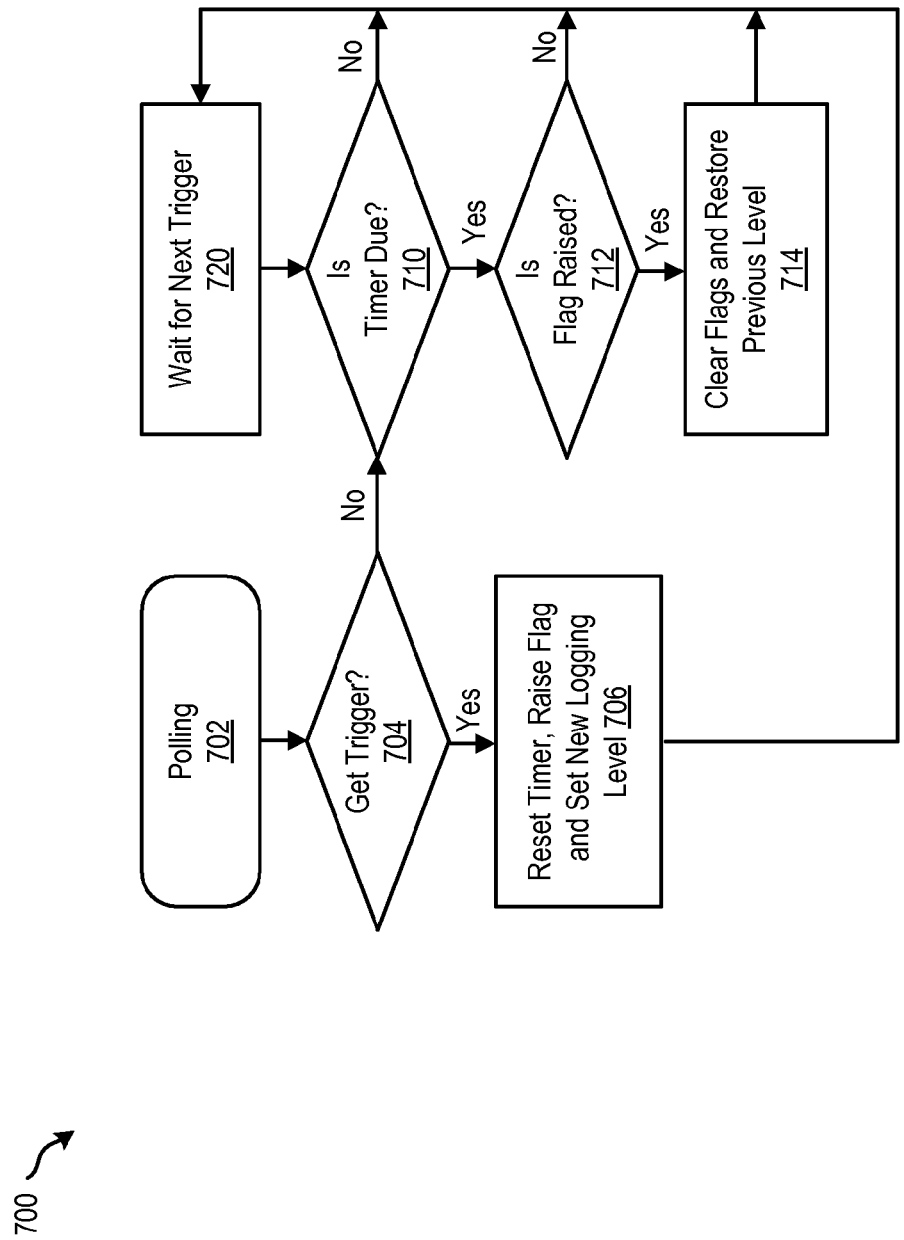
FIG. 7 shows a flow chart of the operation of an automated logging level reset.

Referring to FIG. 7, a flow chart of the operation of an automated logging level reset is shown. More specifically, logging server 105 consistently monitors (e.g., polls) the status and time stamp of applications' current logging level configuration, step 702. As soon as this polling detects a triggering signal such as trigger 503 in step 704, the server reconfigures a new logging level, resets the timer, raises the flag in step 706, and then proceeds to wait for the next check in step 720. When there is no triggering signal in step 704, a decision step 710 checks if an application's timer has expired. If the answer is no, the process proceeds to wait for the next trigger in step 720. If the answer is yes, the process proceeds to step 712 to further check if the reset flag is raised or not. If the answer is no, the process returns to step 720 to monitor for a trigger. If the answer is yes in step 712, in step 714 the process restores the application's logging level to the normal production level, or resets to another lower level, if it still monitors other scenarios. In this way, the system logging service will always be optimized to minimize the consumption of system resources to free up resources for such things as (a) performance, (b) recovering from a system outage, (c) high storage utilization (high access), and resources required during a RAID parity rebuild of a hard disk in the virtual subsystem, etc.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also for example, while the preferred embodiment is disclosed with respect to VTS subsystems, the invention can be extended to Virtual Optical Disk Servers, a Virtual Holographic Disk Servers, or a Virtual Hard Disk Array.

Also for example, the present invention relates to a variant of deduplication called Logging Deduplication. Under logging deduplication, repetitive events are tallied, such as 1000 consecutive fibre channel IDLE commands were received or 30 TEST UNIT READY commands were received. Each command need not receive its own individual time stamp. Additionally, each time stamp may be grouped with a command, so that the command is stored once followed by successive time stamps, e.g. R_RDY stamp1, stamp2, stamp3, etc.

Consequently, the invention is intended to be limited only by the spirit and scope of the appended claims, giving full cognizance to equivalents in all respects.

What is claimed is:

1. A computer-implementable method for logging data in a virtual storage system, said method comprising:
   receiving a logging data string;
   checking a logging level, the checking comprising:
   if said logging level is satisfied, sending said data string to a log file buffer;
   if said logging level is not satisfied, checking a buffer priority; and
   if said buffer priority exceeds a predefined threshold, abandoning said data string; and wherein
   the log file buffer comprises an Error-Data-Cache-Buffer (EDCB) element; and further comprising
   automatically collecting important error logging data which is not at the current planned logging level, and
   temporarily saving the important error logging data in the EDCB element of the log file buffer.

2. The method of claim 1 for logging data in a virtual storage system wherein
   said virtual storage system is taken from a group of virtual tape, virtual optical, virtual holographic and virtual hard disk.

3. The method of claim 1 for logging data in a virtual storage system further comprising
   dynamically resetting a logging level of an application when it is desirable to minimize logging level impact on overall system performance.

4. The method of claim 1 for logging data in a virtual storage system further comprising:
   triggering a run-time logging data level reset function based upon matched error code categories.

5. The method of claim 1 for logging data in a virtual storage system further comprising:
   automatically dumping and storing EDCB data within the EDCB element.

6. A system comprising:
   a processor;
   a data bus coupled to the processor; and
   a computer-usable medium embodying computer program code, the computer-usable medium being coupled to the data bus, the computer program code comprising instructions executable by the processor and configured for:
   receiving a logging data string;
   checking a logging level, the checking comprising:
   if said logging level is satisfied, sending said data string to a log file buffer;
   if said logging level is not satisfied, checking a buffer priority; and
   if said buffer priority exceeds a predefined threshold, abandoning said data string; and wherein
   the log file buffer comprises an Error-Data-Cache-Buffer (EDCB) element; and further comprising
   automatically collecting important error logging data which is not at the current planned logging level, and
   temporarily saving the important error logging data in the EDCB element of the log file buffer.

7. The system of claim 6, wherein
   said virtual storage system is taken from a group of virtual tape, virtual optical, virtual holographic and virtual hard disk.

8. The system of claim 6, wherein the instructions are further configured for:
   dynamically resetting a logging level of an application when it is desirable to minimize logging level impact on overall system performance.

9. The system of claim 6 wherein the instructions are further configured for:
   triggering a run-time logging data level reset function based upon matched error code categories.

10. The system of claim 6 wherein the instructions are further configured for:
    automatically dumping and storing EDCB data within the EDCB element.

11. A non-transitory computer-readable storage medium storing program code, the computer program code comprising computer executable instructions configured for:
    receiving a logging data string;
    checking a logging level, the checking comprising:
    if said logging level is satisfied, sending said data string to a log file buffer;
    if said logging level is not satisfied, checking a buffer priority; and
    if said buffer priority exceeds a predefined threshold, abandoning said data string; and wherein
    the log file buffer comprises an Error-Data-Cache-Buffer (EDCB) element; and further comprising
    the embodied computer program code further comprises computer executable instructions configured for:

automatically collecting important error logging data which is not at the current planned logging level, and temporarily saving the important error logging data in the EDCB element of the log file buffer.

12. The non-transitory computer-readable storage medium of claim 11, wherein: said virtual storage system is taken from a group of virtual tape, virtual optical, virtual holographic and virtual hard disk.

13. The non-transitory computer-readable storage medium of claim 11, wherein the embodied computer program code further comprises computer executable instructions configured for:
dynamically resetting a logging level of an application when it is desirable to minimize logging level impact on overall system performance.

14. The non-transitory computer-readable storage medium of claim 11, wherein the embodied computer program code further comprises computer executable instructions configured for:
triggering a run-time logging data level reset function based upon matched error code categories.

15. The non-transitory computer-readable storage medium of claim 11, wherein the embodied computer program code further comprises computer executable instructions configured for:
automatically dumping and storing EDCB data within the EDCB element.

* * * * *